United States Patent [19]

Pragt et al.

[11] Patent Number: 5,693,244
[45] Date of Patent: Dec. 2, 1997

[54] APPARATUS FOR HEATING LIQUIDS WHICH OPERATES POWER SUPPLY IN RESPONSE TO DETECTION OF HEATING ELEMENT BENDING

[75] Inventors: Johan Pragt; Ronald Wijnsema, both of Drachten, Netherlands

[73] Assignee: U.S. Philips Corporation, New York, N.Y.

[21] Appl. No.: 543,732

[22] Filed: Oct. 16, 1995

[30] Foreign Application Priority Data

Oct. 14, 1994 [GB] United Kingdom ............. 9420751

[51] Int. Cl.[6] ..................... H05B 3/68; H05B 1/02
[52] U.S. Cl. ................. 219/441; 219/518; 219/429
[58] Field of Search ..................... 219/429, 432, 219/436, 438, 441, 449, 450, 456, 518, 708

[56] References Cited

U.S. PATENT DOCUMENTS

| | | | |
|---|---|---|---|
| 1,990,640 | 2/1935 | Doherty | 219/449 |
| 2,749,426 | 6/1956 | Schwaneke | 219/432 |
| 3,098,918 | 7/1963 | Koci et al. | 219/449 |
| 3,445,630 | 5/1969 | Ulam | 219/438 |
| 4,063,068 | 12/1977 | Johnson et al. | 219/441 |
| 4,160,152 | 7/1979 | Wightman et al. | 219/438 |
| 4,310,748 | 1/1982 | Paulin | 219/438 |
| 4,335,298 | 6/1982 | Newbold, Jr. | 219/441 |
| 4,430,556 | 2/1984 | Inskip et al. | 219/441 |
| 4,801,782 | 1/1989 | Ineson | 219/438 |
| 5,345,063 | 9/1994 | Reusche et al. | 219/441 |

FOREIGN PATENT DOCUMENTS

| | | |
|---|---|---|
| 2153190 | 8/1985 | United Kingdom . |
| 2269980 | 2/1994 | United Kingdom . |

*Primary Examiner*—Teresa J. Walberg
*Assistant Examiner*—Raphael Valencia
*Attorney, Agent, or Firm*—Ernestine C. Bartlett

[57] ABSTRACT

Apparatus (1a, 1b) for heating liquids has a receptacle (10) for receiving liquid to be heated, a heating element (30) in the form of a support (31) having an electrically insulating surface (32b) carrying a resistive track (33) for heating liquid within the receptacle (10) and a control arrangement (40) for controlling the supply of power to the heating element (30). The control arrangement (40) includes a detector (41) for detecting deflection of the heating element (30), during operation of the apparatus and for reducing the power supply to the heating element (30) when the deflection of the heating element (30) exceeds a predetermined amount so providing a simple, efficient way of switching off the apparatus if the heating element (30) overhears due to, for example, the apparatus being boiled dry or the vessel (2a, 2b) being tilted to expose the heating element out of the liquid being heated.

19 Claims, 2 Drawing Sheets

APPARATUS FOR HEATING LIQUIDS WHICH OPERATES POWER SUPPLY IN RESPONSE TO DETECTION OF HEATING ELEMENT BENDING

BACKGROUND OF THE INVENTION

This invention relates to apparatus for heating liquids.

UK Patent Applications Publications. Nos. GB-A-2269980 and GB-A-2153190 describe apparatus for heating liquids such as water, the apparatus comprising a receptacle for receiving liquid to be heated, a heating element comprising a support having an electrically insulating surface carrying a resistive track for heating liquid within the receptacle and a control arrangement for controlling the supply of power to the heating element.

In each of the examples described in UK Patent Applications Publications Nos. GB-A-2269980 and GB-A-2153190, the control arrangement for controlling the supply of power to the heating element includes a temperature sensing element provided on the heating element as a safety measure to provide an indication of the temperature of the heating element and to enable the power supply to the heating element to be removed when the temperature of the heating element exceeds a predetermined maximum allowable temperature. Such temperature sensors are provided to detect when the heating element is not exposed to the liquid being heated during operation as may occur if, for example, the user has forgotten to fill the vessel with liquid or the vessel is tilted during operation. The use of such temperature sensors on the heating element does, however, require additional electrical connection to be made to the heating element which may add to manufacturing costs.

It is an aim of the present invention to provide an alternative way of giving an indication of the temperature of the heating element without, necessarily, having to provide temperature sensing elements on the heating element.

SUMMARY OF THE INVENTION

According to the present invention, there is provided apparatus for heating liquids comprising a receptacle for receiving liquid to be heated, a heating element comprising a support having an insulating surface carrying a resistive track for heating liquid within the receptacle and a control arrangement for controlling the supply of power to the heating element, which control arrangement comprises means for detecting deflection of the heating element during operation of the apparatus and for removing the power supply to the heating element when the deflection of the heating element exceeds a predetermined amount.

The present inventors have thus found that in operation of apparatus having such a heating element, the difference in temperature arising between the surfaces of the heating element during operation of the heating element causes the heating element to deflect, that a marked increase in this temperature difference occurs when the heating element is not in thermal contact with liquid being heated (for example if the apparatus is tilted or boiled dry) and that the deflection occurs in a sufficiently reproducible manner to allow the deflection to be used to provide a signal to operate the control arrangement to reduce, generally to remove, the power supply to the heating element when the heating element is not in thermal contact with liquid being heated to prevent excessive heating of the heating element which could otherwise damage the apparatus or result in a safety hazard to the user.

Generally, the support is formed of electrically conductive material and is coated with an electrically insulating thermally conductive material which forms the insulating surface.

The heating element preferably, forms part of the wall of the receptacle. This should simplify the construction of the apparatus and allow the heating element to be in as close a contact as possible to the liquid to be heated to facilitate efficient heat transfer to and thus rapid heating of the liquid which may generally be water. However, the heating element could possibly be mounted in the manner shown in GB-A-2153190. In such a mounting, the heater is mounted, preferably cemented using a dental ceramic adhesive, via a connecting component, which is preferably aluminum, and is bonded to a wall of the vessel, preferably an inner wall of the vessel. With reference to FIG. 6, there is shown a vessel 6', within which a heater 7' is assembled. The heater 7' is cemented through an aluminum connecting component 8', which is bonded into a rear wall 9' of the vessel 6', so that circular portion 1' of the substrate, upon which the heater is screen printed, extends into the interior region 10' of the vessel 6' and protruding portion 2' of the substrate extends into an exterior back region 11' of the vessel 6'. Preferably, both the heater 7' and the component 8' are flame sprayed with aluminum prior to assembly in the vessel. The heater 7' is then cemented into the component 8' by a dental ceramic adhesive, and electrical connection tabs, one being shown at 12' are then attached, either by bonding or mechanical attachment for example, through holes 3', to portion 2' of the heater disposed within the region 11'. The heater may be energized by insertion through aperture 13' of a plug, not shown. There are also illustrated a user-operable on/off button 16', and temperature sensors, 14' and 15' which may be included herein but are not essential to the invention.

The detecting means may comprise a switch having a switch member movable between a first position allowing power to be supplied to the resistive track and a second position removing the power supply to the resistive track, the switch member being mounted adjacent the heating element so that, when the deflection of the heating element exceeds the predetermined amount, the heating element causes the switch member to move to the second position to remove the power supply to the resistive track. Such an arrangement provides a relatively simple cost-effective way of detecting when the deflection of (and thus the temperature of) the heating element has exceeded the predetermined amount.

Other detecting means may be possible. Thus, for example, it may be possible to arrange for the heating element to break the path of an electromagnetic radiation beam when the deflection exceeds the predetermined amount. This could be achieved by, for example, mounting a light emitting diode and a photosensor in the apparatus so that the light path between the light emitting diode and photosensor is broken by the heating element when the bending of the heating element exceeds the predetermined amount. Another possibility, where the support is formed of a suitable material, is to use a magnetic proximity detection system to detect the deflection of the heating element. Such detecting means may be particularly advantageous when using a mounting arrangement such as that described above and in in GB-A-2153190.

The receptacle may be provided with a handle and a spout for allowing liquid to be poured out of the receptacle. The apparatus may in such a circumstance be apparatus normally known as an electrical kettle. The present invention may, however, be applied to other types of apparatus such as coffee makers or stand-alone electric cookers/steamers.

The control arrangement may further comprise a steam responsive switch for detecting boiling of liquid within the vessel and for removing the power supply to the resistive track after detection of steam emanating from liquid being heated in the receptacle.

The insulating, surface of the support may also carry one or more temperature sensors for enabling precise control of the heating operation.

BRIEF DESCRIPTION OF THE DRAWINGS

Embodiments of the present invention will now be described, by way of example, with reference to the accompanying drawings, in which

FIG. 6 is a part broken partially cross-sectional view of an apparatus illustrating an alternative mounting of the heater in a vessel.

It should of course be understood that the drawings are not to scale and that like reference numerals are used through text to refer to like parts.

DETAILED DESCRIPTION OF THE PREFERRED EMBODIMENTS

Figure 1:
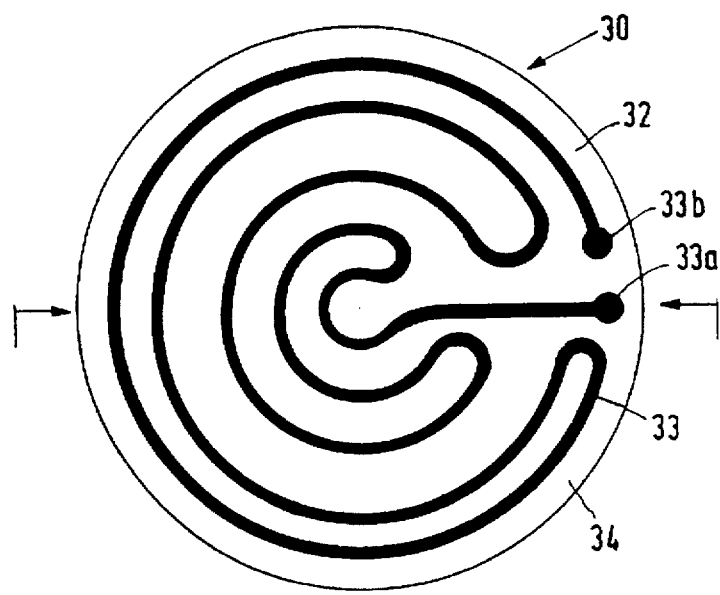
FIG. 1 is a plan view of a heating element suitable for use in apparatus in accordance with the invention.

Referring now to the drawings, there is illustrated apparatus 1a, 1b for heating liquids such as water comprising a receptacle 10 for receiving liquid to be heated, a heating element 30 comprising a support 31 having an electrically insulating surface 32a carrying a resistive track 33 for heating liquid within the receptacle and a control arrangement 40 for controlling the supply of power to the heating element, which control arrangement 40 comprises means 41 for detecting deflection of the heating element 30 during operation of the apparatus 1a, 1b and for reducing the power supply to the heating element 30 when the deflection of the heating element 30 exceeds a predetermined amount.

The present inventors have thus found that in operation of apparatus having such a heating element 30, the difference in temperature arising between the surfaces of the heating element 30 during operation of the heating element causes the heating element to deflect, that a marked increase in this temperature difference occurs when the heating element 30 is not in thermal contact with liquid being heated (for example if the apparatus is tilted or boiled dry) and that the deflection occurs in a sufficiently reproducible manner to allow the deflection to be used to provide a signal to operate the control arrangement 40 to reduce, generally to remove, the power supply to the heating element when the heating element 30 is not in thermal contact with liquid being heated to prevent excessive heating of the heating element which could otherwise damage the apparatus or result in a safety hazard to the user.

Figure 2:
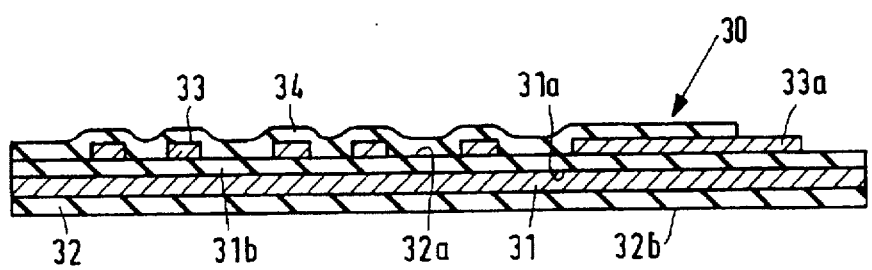
FIG. 2 is a cross-sectional view taken along the line II—II in FIG. 1 of the heating element shown in FIG. 1.

Referring now specifically to the drawings FIGS. 1 and 2 illustrate an example of a heating element 30 suitable for use in apparatus in accordance with the invention. In this example, the heating element 30 comprises an electrically conductive support 31 which is capable of deflecting or bending with temperature and is formed of steel or any other suitable, sufficiently strong, electrically conductive material, generally a metal or metal alloy. The support 31 is coated with an electrically insulating but thermally conductive layer 32 which may be formed of any suitable heat resistant electrically insulating but thermally conductive material such as a vitreous enamel or a glass ceramic applied using any appropriate known technique. Where the heating element is to be mounted in a plastic material vessel 2a, then both surfaces 31a and 31b of the support may, as shown in FIG. 2, be coated with the layer 32.

The layer 32 provides the electrically insulating surface 32a on which the resistive track is defined using any suitable thick film technique such as, for example, screen-printing. The thickness, width, length and pattern or path of the resistive track 33 will, of course, be chosen to meet the specific requirements for which the apparatus is to be used and it will, of course, be appreciated by those skilled in the art that FIG. 1 is only a diagrammatic representation of one possible type of track layout. The resistive track may be formed of any suitable electrically conductive resistive material which, as indicated above, is deposited or applied to a surface using a thick film technique. For example, the resistive material may be a palladium-silver alloy, platinum or nickel. The resistive track 33 is covered by a further insulating layer 34 (which may be formed of a similar ceramic material to the insulating layer 32) so as to leave only contact portions 33a and 33b of the resistive track 33 exposed.

In a typical example, the support 31 is a stainless steel support of 1 mm (millimeters) thickness with a diameter of 130 mm coated on each side with a 200 μm (micrometer) thick layer of enamel or a suitable glass-ceramic material and the resistive track 33 occupies a central area 100 mm across of the support 31.

Figure 3:
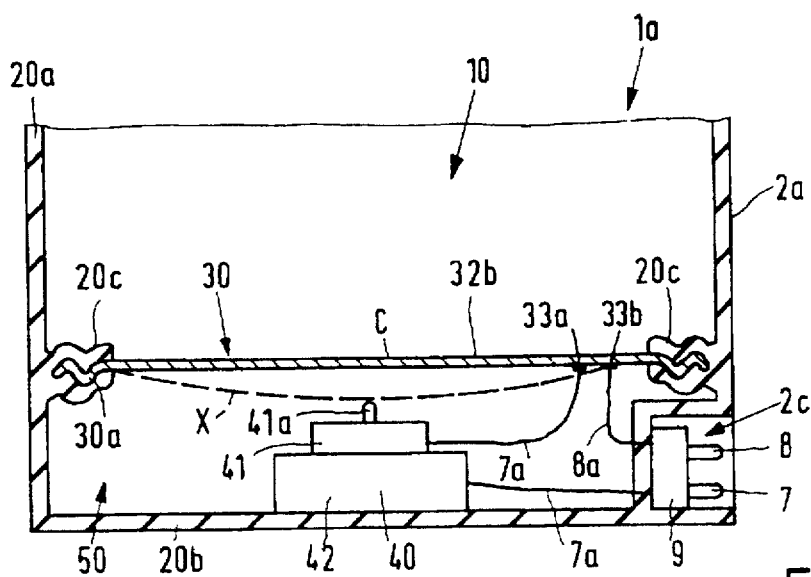
FIG. 3 is a partially cross-sectional view of part of one example of apparatus in accordance with the invention.

FIG. 3 illustrates part of an apparatus in accordance with the invention incorporating a heating element 30 of FIGS. 1 and 2. The apparatus 1a shown in FIG. 3 may be, for example, an electrical kettle similar to the jug-type electrical kettles shown in UK Patent Application Publications Nos. 2269980 and 2153190 or could be any other apparatus in which liquids are heated for domestic purposes, for example, a tea-urn or the like or a stand-alone electrical cooking pot in which water may be heated for cooking vegetables and the like or in which beverages or soups and similar high water content food items, (for simplicity, referred to herein as 'liquids') may be cooked.

In the example illustrated in FIG. 3, a vessel 2a is formed of a plastic material such as polypropylene to define side walls 20a and a base 20b. The side walls 20a of the vessel 2a are provided with an inwardly directed projection or flange 20c which supports the heating element 30. Thus, the periphery of the heating element 30 may be embedded within the projection 20c by locating the heating element 30 in the mold within which the plastic vessel 2a is formed so that the projections 20c are molded around the periphery of the heating element 30. To facilitate adhesion of the plastic material to the periphery 30a, the periphery 30a of the support 31 of the heating element may as shown be formed with undulations or corrugations. Of course, any other suitable method of mounting the heating element 30 to be vessel 2a, may be used.

The heating element 30 forms with the side wall 20a of the plastic material vessel 2a the receptacle 10 and the control arrangement 40 is located in a chamber 50 formed between the heating element 30 and the base wall 20b. The heating element 30 is mounted to the vessel 2a with the resistive track 33 facing away from the receptacle 10, that is with the surface 32b arranged to be in contact with the liquid to be heated.

The control arrangement 40 includes at least live and neutral terminal pins 7 and 8 mounted in a terminal housing 9 itself mounted within a chamber 2c formed within the vessel side wall 20a. Although not shown, where required, the control arrangement may also include a third (earth) terminal pin. The terminal pins are arranged to couple with respective coupling sockets of a mains power supply lead (not shown) to enable power to be supplied to the heating element 30 via an appropriate mains power supply. The terminal pins 7 and 8 are coupled via respective wires 7a and 8a to the contacts 33a and 33b of the resistive track. Connection between the wires 7a and 7b and the respective contacts 33a and 33b may be by way of soldering or any other suitable technique to establish electrical connection.

The control arrangement 40 is coupled in series in one of the wires 7a and 8a (the wire 7a in the example shown) so as to enable the power supply to the resistive track 33 to be interrupted by the control arrangement 40.

In the example illustrated in FIG. 3, the control arrangement comprises a microswitch 41 mounted on a support 42 so that the switch member 41a of the microswitch is at a predetermined distance below the center C of the heating element 30 when the heating element 30 is at room temperature. The microswitch 41 is located below the center C of the heating element 30 because the center C should be the area of maximum deflection as the edge of the heating element 30 is held securely in place. As another possibility, the microswitch could be biassed by appropriate spring biassing means or the like against the lower surface of the heating element 30 and forced downwardly by the deflection with temperature to a position at which the switch 41 operates to cut off the power supply to the heating element 30.

Although not shown in FIG. 3, the apparatus may, as in conventional stand-alone mains powered domestic appliances, be provided with a mains switch operable by a user to enable the user to manually connect or disrupt the power supply to the heating element without removing the mains supply lead.

In operation of the apparatus shown in FIG. 3, assuming that the mains power supply lead is coupled to the terminal pins and to an appropriate mains power supply point, then liquid, for example water, placed within the receptacle 10 defined by the vessel 2a will be heated by the heating element 30. Although not shown in FIG. 3, the apparatus may be provided with a conventional thermostat so as to regulate the heating action of the heating element and/or with a steam sensor to detect boiling of liquid within the vessel 2a.

If, during operation of the apparatus, the heating element 30 becomes exposed because, for example, insufficient liquid has been placed in the receptacle and the apparatus has boiled-dry or the apparatus has accidentally been tilted so that the heating element 30 projects out of any liquid remaining in the vessel then, because heat transfer from the heating element 30 to air will not be as efficient as that from the heating element to liquid, the temperature of the heating element 30 will rise excessively.

The present inventors have found that, as the temperature of the heating element rises, the heating element 30 will deflect or bow downwardly as illustrated schematically by the dashed line X in FIG. 3 so that the support 31 becomes concave when viewed from the surface 32b.

Figure 4:
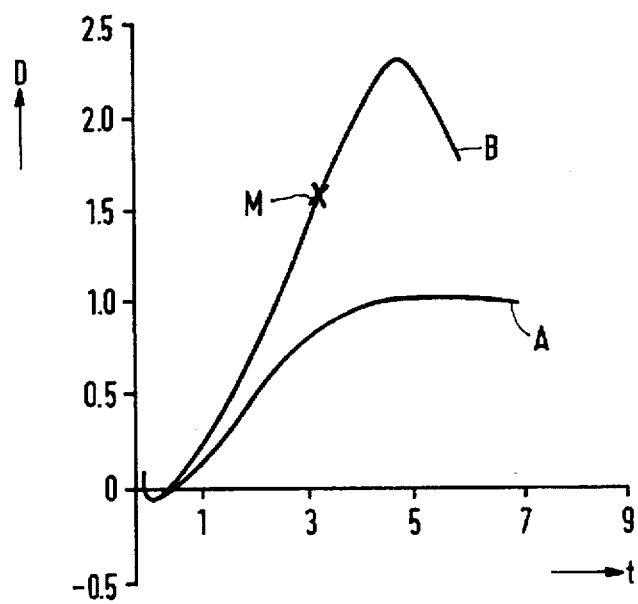
FIG. 4 is a graph of the amount of deflection in millimeters (mm) of the heating element against time in seconds.

FIG. 4 illustrates the results of experiments carried out to study the effect of heating on such a heating element 30. Thus, FIG. 4 shows the downward deflection D in millimeters (mm) of the center C of the surface 32b of the support 31 of the heating element 30 as a function of time t in seconds when power is being supplied to the heating element 30 in a normal manner so as to heat any liquid provided within the receptacle 10 of the vessel 2a. In this example, the support 31 is a 1 mm thick steel plate having a diameter of 130 mm coated on both sides with a 200 μm coating of enamel or a suitable glass-ceramic dielectric and carrying a silver-palladium heating track 33 occupying an area of the support 31 having a diameter of 100 mm.

The curve A in FIG. 4 shows the deformation of the thick film heating element 30 during normal operation of the apparatus 1a. As can be seen from FIG. 4, the degree of bending or deflection of the central portion C of the heating element 30 resulting from the difference in temperature between the two surfaces of the heating element 30 increases gradually until the water within the receptacle 10 begins to boil when the deflection stabilizes at around about in this example, 1 millimeter. This degree of deflection or bending is not sufficient to actuate the microswitch 41.

In complete contrast, when the apparatus 1a is operated in such a manner that the heating element 30 becomes exposed out of the water, that is when, for example, the apparatus is boiled dry or tilted, the degree of bending or deflection of the central portion C of the heating element 30 is, as shown by curve B in FIG. 4, considerably more marked and the heating element 30 deflects or bows rapidly until after just over three seconds the deflection reaches around about 1.5 millimeters as indicated by the marked point M.

The present inventors have found that the difference in the deflection or bending of the heating element 30 under normal operational conditions and under boil-dry conditions is sufficient to allow this deflection or bending to be used as an indication that the apparatus is being operated with insufficient liquid within the receptacle 10 or has been accidentally tilted. The switch member 41a of the microswitch 42 shown in FIG. 3 is located at such a distance below the exposed surface 31b of the support 31 of the heating element 30 that a deflection or bending of about 2.25 millimeters of the central portion of the heating element 30 is sufficient to move the switch member 41a from a first normal operational position to a second position in which the microswitch 41 interrupts the electrically conductive path along the wire 7a so removing or disconnecting the power supply from the heating element 30 and thus turning off the apparatus 1a.

Figure 5:
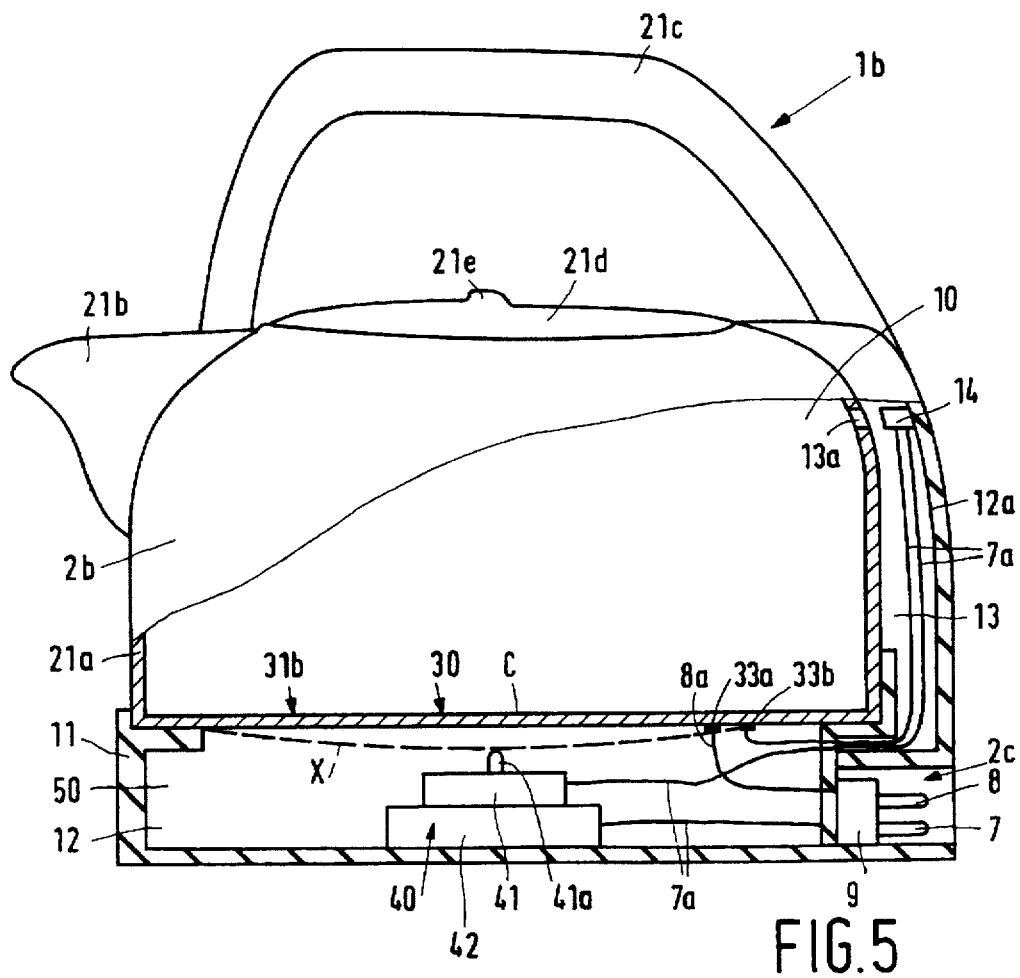
FIG. 5 is a part broken away part-cross-sectional view of a second example of apparatus in accordance with the invention.

FIG. 5 illustrates another example of apparatus 1b in accordance with the invention. In this case, the apparatus comprises a so-called conventional kettle having a kettle body or vessel 2b formed of a metal such as stainless steel or aluminum. The kettle body 2b has side walls 21a, a spout 21b for enabling water to be poured into/or out of the kettle body 2b and a handle 21c for enabling the kettle body 2b to be lifted up by a user to enable water to be poured into or out of the kettle. As in the example illustrated by FIG. 5, the side walls 21a may define a top opening beneath the handle 21c which is covered by a lid 21d which may be formed of metal or a plastic material. The lid 21d is provided with a knob 21e or similar device to enable its removal by a user for allowing, if desired, filling of the kettle via the top opening or to allow cleaning of the inside of the kettle.

The base of the kettle body 2b is formed, in this example, mainly by the heating element 30 with, for example, an exposed peripheral area of the metal support 31 of the heating element being sealed to the side wall 21a by any suitable metal-to-metal sealing technique such as soldering or welding. Of course, any other suitable form or means of mounting the heating element to the kettle body may be used. In this example, the heating element 30 is again mounted so that the resistive track faces away from the receptacle 10 for liquid defined by the side walls 21a and the heating element 30. In this example where the kettle body 2b is formed of metal, then the surface 31b of the support 31 remote from the resistive track 33 may be uncoated so that both the side walls 21a and the base of the receptacle 10 are defined by metal.

A false bottom 11 for the kettle 1b is provided by a molded plastic base 12 which defines the chamber 50 for the control arrangement 40. The plastic molded base 12 may be secured to the metal body of the kettle by any suitable means, for example, a suitable form of screw fixing. The control arrangement 40 comprises, in this example, an arrangement similar to that shown in FIG. 3, namely a microswitch 41 mounted on a support 42 coupled in the conductive path between one of the contacts 33a, 33b of the resistive track and the associated terminal pin 7.

The kettle 1b may also be provided with a steam sensor for automatically removing or disconnecting the power supply to the kettle so as to switch the kettle off when water within the kettle boils. In the example shown, a portion 12a of the molded plastic base 12 (or if desired a separate plastics component) extends along the side wall 21a of the kettle body 2b to define therewith a chamber 13. A suitable steam sensor 14 such as a thermistor, a memory metal or bimetallic element is mounted within the chamber 13 adjacent the aperture 13a and is operative to disrupt the conductive path via one of the wires 7a and 8a when the steam sensor is actuated by steam passing through the aperture 13a.

Any other suitable form of steam sensing arrangement may be used, for example, an arrangement such as described in UK Patent Application Publication No. 2233182 may be used. As another possibility, a steam tube arrangement similar to, for example, that shown in UK Patent No. 1274552 could be used.

The terminal pins 7 and 8 (and earth terminal pin if provided) are mounted in a terminal housing 9a defined within the molded plastic base 12 and, as in the example described above with reference to FIG. 3, are arranged to couple with respective coupling sockets of a mains power supply lead (not shown) to enable power to be supplied to the heating element 30 via an appropriate mains power supply.

The conventional kettle 1b shown in FIG. 5 operates in a manner similar to that of the apparatus 1a shown in FIG. 3. Thus, when a user connects the mains power supply to the heating element by connecting an appropriate mains power supply lead (not shown) to the mains power supply and to the terminal pins and operates any mains on/off switch (not shown) provided on the kettle body, then power will be supplied to the resistive track 33 causing heating of any liquid within the receptacle 10. During normal operation of the kettle 1b, that is when the kettle has been at least partly filled with water so that the heating element 30 is covered, then the temperature of the heating element will rise in a relatively steady manner and the deflection or bending of the central portion C of the heating element 30 resulting from the difference in temperature of the surfaces 32a and 32b will follow curve A in FIG. 4. As in the example shown in FIG. 3, if the kettle 1b is boiled dry or is tilted excessively so that the heating element 30 becomes exposed out of the water, then the temperature of the heating element 30 will rise more rapidly and the deflection of the central portion of the heating element will follow the curve B in FIG. 4 so that at about just after seven seconds of operation of the kettle 1b with the heating element exposed, the central portion C of the heating element will deflect sufficiently to move the switch member 41a of the microswitch 41 to the second position in which the microswitch 41 interrupts the electrically conductive path along the wire 7a so removing or disconnecting the power supply from the heating element 30 and thus turning off the kettle 1b. Of course, during normal operation when there is sufficient water in the kettle receptacle 10, to cover the heating element 30, then the kettle will be switched off automatically by the steam sensor 14 shortly after the kettle starts to boil as indicated by the flattening of the curve A in FIG. 4.

It will, of course, be appreciated that apparatus in accordance with the present invention may be in the form of a jug kettle rather than a conventional kettle and that the kettle may be formed of any suitable material, for example metal or plastic as described above or a combination of those two materials. Also, as mentioned above, the present invention may be applied to other forms of domestic liquid heating apparatus such as tea-urns, electrical cooking pots and the like. The present invention may also be applied to apparatus which comprises a hot plate onto which a separate vessel or receptacle containing liquid, generally water, to be heated is placed. For example, the present invention may be applied to coffee makers which incorporate a hot plate for heating coffee liquor produced by another part of the coffee maker to maintain the coffee at a desired temperature. Such a hot plate may have, for example, a structure similar to that shown in FIG. 3 but with the side wall 2a ending approximately level with the surface 32b. In such a case, deflection of the heating element 30 sufficient to activate the microswitch 41 will arise when the hot plate is left switched on when the receptacle is either removed or is empty.

Other means for detecting the deflection of the heating element 30 may be used. Thus, for example, it may be possible to arrange for the heating element to break the path of an electromagnetic radiation beam when the bending exceeds the predetermined amount. This could be achieved, for example, by mounting a light emitting diode and a photosensor in the apparatus so that the light path between the light emitting diode and photosensor is broken by the heating element when the bending of the heating element exceeds the predetermined amount. Another possibility, where the support is formed of a suitable material, is to use a magnetic proximity detection system to detect the deflection of the heating element.

From reading the present disclosure, other modifications and variations will be apparent to persons skilled in the art. Such modifications and variations may involve other features which are already known in the art and which may be used instead of or in addition to features already described herein. Although claims have been formulated in this application to particular combinations of features, it should be understood that the scope of the disclosure of the present application also includes any novel feature or combination of features disclosed herein either explicitly or implicitly, whether or not relating to the same invention as presently claimed in any claim and whether or not it mitigates any or all of the same technical problems as does the presently claimed invention. The applicants hereby give notice that new claims may be formulated to such features and/or combinations of such features during prosecution of the present application or of any further application derived therefrom.

We claim:

1. An apparatus for heating liquids comprising a receptacle for receiving liquid to be heated, a heating element comprising a support having an electrically insulating surface carrying a resistive track for heating liquid within the receptacle, differences in temperature between surfaces of the heating element causing deflection of said heating element during operation of the apparatus, and a control arrangement for controlling the supply of power to the heating element, which control arrangement comprises means for detecting deflection of the heating element during operation of the apparatus and for reducing the power supply to the heating element when the deflection of the heating element exceeds a predetermined amount.

2. An apparatus according to claim 1, wherein the heating element forms part of the wall of the receptacle.

3. An apparatus according to claim 2, wherein the detecting means comprises a switch having a switch member movable between a first position allowing power to be supplied to the resistive track and a second position removing the power supply to the resistive track, the switch member being mounted adjacent the heating element so that, when the deflection of the heating element exceeds the predetermined amount, the heating element causes the switch member to move to the second position to remove the power supply to the resistive track.

4. An apparatus according to claim 2, wherein the receptacle is provided with a handle and a spout for allowing liquid to be poured out of the receptacle.

5. An apparatus according to claim 2, wherein the control arrangement further comprises a steam responsive switch for detecting boiling of liquid within the receptacle and for removing the power supply to the resistive track after detection of steam emanating from liquid being heated in the receptacle.

6. An apparatus according to claim 2, wherein the support is formed of electrically conductive material and is coated with an electrically insulating thermally conductive material which forms the insulating surface.

7. An apparatus according to claim 1, wherein the detecting means comprises a switch having a switch member movable between a first position allowing power to be supplied to the resistive track and a second position removing the power supply to the resistive track, the switch member being mounted adjacent the heating element so that, when the deflection of the heating element exceeds the predetermined amount, the heating element causes the switch member to move to the second position to remove the power supply to the resistive track.

8. An apparatus according to claim 7, wherein the receptacle is provided with a handle and a spout for allowing liquid to be poured out of the receptacle.

9. An apparatus according to claim 7, wherein the control arrangement further comprises a steam responsive switch for detecting boiling of liquid within the receptacle and for removing the power supply to the resistive track after detection of steam emanating from liquid being heated in the receptacle.

10. An apparatus according to claim 7, wherein the support is formed of electrically conductive material and is coated with an electrically insulating thermally conductive material which forms the insulating surface.

11. An apparatus according to claim 1, wherein the receptacle is provided with a handle and a spout for allowing liquid to be poured out of the receptacle.

12. An apparatus according to claim 11, wherein the control arrangement further comprises a steam responsive switch for detecting boiling of liquid within the receptacle and for removing the power supply to the resistive track after detection of steam emanating from liquid being heated in the receptacle.

13. An apparatus according to claim 11, wherein the support is formed of electrically conductive material and is coated with an electrically insulating thermally conductive material which forms the insulating surface.

14. An apparatus according to claim 1, wherein the control arrangement further comprises a steam responsive switch for detecting boiling of liquid within the receptacle and for removing the power supply to the resistive track after detection of steam emanating from liquid being heated in the receptacle.

15. An apparatus according to claim 14, wherein the support is formed of electrically conductive material and is coated with an electrically insulating thermally conductive material which forms the insulating surface.

16. An apparatus according to claim 1, wherein the support is formed of electrically conductive material and is coated with an electrically insulating thermally conductive material which forms the insulating surface.

17. An apparatus for heating liquids comprising a receptacle for receiving liquid to be heated, a heating element comprising a support having an electrically insulating surface carrying a resistive track for heating liquid within the receptacle, an increase in differences in temperature between surfaces of the heating element causing deflection of said heating element during operation of the apparatus, and a control arrangement for controlling the supply of power to the heating element, which control arrangement comprises means for detecting deflection of the heating element during operation of the apparatus and for reducing the power supply to the heating element when the deflection of the heating element exceeds a predetermined amount responsive to said heating element not being in contact with liquid being heated.

18. An apparatus for heating liquids comprising a receptacle for receiving liquid to be heated, a heating element comprising a support having an electrically insulating surface carrying a resistive track for heating liquid within the receptacle, differences in temperature between surfaces of the heating element causing deflection of said heating element during operation of the apparatus, and a control arrangement for controlling the supply of power to the heating element, which control arrangement comprises means for detecting deflection of the heating element during operation of the apparatus and for reducing the power supply to the heating element when the deflection of the heating element exceeds a predetermined amount responsive to the absence of liquid in the receptacle.

19. An apparatus for heating liquids comprising a receptacle for receiving liquid to be heated, a heating element comprising a support having an electrically insulating surface carrying a resistive track for heating liquid within the receptacle, an increase in differences in temperature between surfaces of the heating element causing deflection of said heating element during operation of the apparatus, and a control arrangement for controlling the supply of power to the heating element, which control arrangement comprises means for detecting deflection of the heating element during operation of the apparatus and for reducing the power supply to the heating element when the deflection of the heating element exceeds a predetermined amount responsive to liquid in the receptacle being tilted.

* * * * *